United States Patent
Kumar et al.

(10) Patent No.: US 10,816,345 B2
(45) Date of Patent: Oct. 27, 2020

(54) ENHANCING NAVIGATION EXPERIENCE USING V2X SUPPLEMENTAL INFORMATION

(71) Applicant: QUALCOMM Incorporated, San Diego, CA (US)

(72) Inventors: Akash Kumar, Hyderabad (IN); Sai Pradeep Venkatraman, Santa Clara, CA (US); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 16/016,332

(22) Filed: Jun. 22, 2018

(65) Prior Publication Data
US 2019/0390963 A1 Dec. 26, 2019

(51) Int. Cl.
*G01C 21/28* (2006.01)
*H04W 4/40* (2018.01)
(Continued)

(52) U.S. Cl.
CPC ............. *G01C 21/28* (2013.01); *G01C 21/20* (2013.01); *G01C 21/3667* (2013.01); *G01C 21/3697* (2013.01); *G05D 1/0212* (2013.01); *H04W 4/40* (2018.02); *G01C 21/3691* (2013.01); *G05D 1/0276* (2013.01); *G05D 2201/0213* (2013.01)

(58) Field of Classification Search
CPC .... G01C 21/28; G01C 21/20; G01C 21/3667; G01C 21/3697; G01C 21/3691; H04W 4/40; G05D 1/0212; G05D 1/0276; G05D 2201/0213
See application file for complete search history.

(56) References Cited

U.S. PATENT DOCUMENTS

2010/0070167 A1    3/2010   Mudalige
2010/0088025 A1    4/2010   Garg et al.
(Continued)

FOREIGN PATENT DOCUMENTS

CN    105841713 A    8/2016
GB    2535784 A    8/2016
WO    2014139821 A1    9/2014

OTHER PUBLICATIONS

Partial International Search Report—PCT/US2019/033243—ISA/EPO—dated Aug. 1, 2019.
(Continued)

*Primary Examiner* — Yazan A Soofi
*Assistant Examiner* — Naeem Taslim Alam
(74) *Attorney, Agent, or Firm* — Weaver Austin Villeneuve & Sampson LLP

(57) ABSTRACT

Embodiments of the disclosure are directed to the use of supplemental information received from Vehicle-to-Everything (V2X) capable entities in order to enhance navigation and route selection based on available advanced driver assistance systems (ADAS) functionality. A number of potential routes are evaluated by retrieving the V2X capabilities and locations from V2X capable entities along those routes. That information is used to assess traffic density and availability of supplemental information used by ADAS along each route, allowing for an evaluation of each route on travel time and ADAS support. The driver can then select the best route that supports their needs.

20 Claims, 8 Drawing Sheets

(51) Int. Cl.
*G01C 21/20* (2006.01)
*G01C 21/36* (2006.01)
*G05D 1/02* (2020.01)

(56) References Cited

U.S. PATENT DOCUMENTS

| | | | |
|---|---|---|---|
| 2010/0228574 A1* | 9/2010 | Mundinger | G01C 21/3423 705/4 |
| 2013/0321466 A1* | 12/2013 | Kocienda | G01C 21/26 345/635 |
| 2016/0123761 A1* | 5/2016 | Van Wieringen | G01C 21/3415 701/465 |
| 2016/0370201 A1 | 12/2016 | Pudiyathanda et al. | |
| 2017/0122761 A1* | 5/2017 | Lin | G01C 21/3667 |
| 2018/0098227 A1* | 4/2018 | Carnelli | H04W 16/18 |

OTHER PUBLICATIONS

Barrachina J., et al., "V2X-d: A Vehicular Density Estimation System that Combines V2V and V2I Communications", 2013 IFIP Wireless Days (WD), Nov. 1, 2013 (Nov. 1, 2013), pp. 1-6, XP055641003, DOI: 10.1109/WD.2013.6686518, ISBN: 978-1-4799-0543-0, Section I.

International Search Report and Written Opinion—PCT/US2019/033243—ISA/EPO—dated Nov. 21, 2019.

Autotalks: "V2X Communication for Autonomous Driving", Oct. 9, 2017, 2 Pages.

Sanguesa J.A., et al., "Sensing Traffic Density Combining V2V and V2I Wireless Communications", Sensors (Basel), vol. 15, No. 12, Dec. 2015, pp. 31794-31810.

* cited by examiner

ENHANCING NAVIGATION EXPERIENCE USING V2X SUPPLEMENTAL INFORMATION

FIELD OF THE INVENTION

Embodiments of the disclosure relate to autonomous driving and advanced driver assistance systems (ADAS). More specifically, embodiments of the disclosure are related to the use of supplemental information obtained from Vehicle-to-Everything (V2X) enabled entities to enhance navigation and scheduling based on availability of autonomous driving and ADAS.

BACKGROUND OF THE INVENTION

Advanced driver assistance systems (ADAS) are systems configured to automate/adapt/enhance vehicle systems for safety and better driving. For instance, ADAS can be used to avoid collisions and accidents by alerting the driver to potential problems, or by implementing safeguards and taking over control of the vehicle. Other common features associated with ADAS include automated lighting, automated braking, global positioning system (GPS)/traffic warnings, alerts to the driver to other cars or dangers, displaying what is in blind spots, and keeping the driver in the correct lane. More complex ADAS features may include electronic stability control, anti-lock brakes, lane departure warning, adaptive cruise control and traction control, and even autonomous driving functionality.

ADAS relies on input and information from multiple data sources to be effective. ADAS can obtain some of the information directly from the primary vehicle through the use of sensors, automotive imaging, LiDAR, radar, image processing, computer vision, and so forth. Additional inputs are also possible from other sources separate from the primary vehicle platform, such as other vehicles and entities on the road. This kind of supplemental information is typically obtained through communication standards such as Vehicle-to-Vehicle (V2V), Vehicle-to-Infrastructure (V2I), and Vehicle-to-Everything (V2X) communication, which involves passing information between a vehicle and any other entity that may affect or be affected by the vehicle, such as infrastructure (e.g., a stop light), pedestrians, other vehicles, and so forth.

However, the supplemental information received from V2X-capable entities may have additional uses beyond directly driving on-board ADAS functionality. In particular, the supplemental information can also be used to generate suggestions to the driver and enable the driver to make better decisions. Embodiments of the disclosure are directed to using the supplemental information obtained from V2X-capable entities in order to enhance navigation, route selection, and scheduling based on the availability of autonomous driving and ADAS features.

BRIEF SUMMARY OF THE INVENTION

In various embodiments, a method is disclosed that includes obtaining a destination address and a source address. The method also includes determining a plurality of routes from the source address to the destination address. For each route in the plurality of routes, the availability of Vehicle to Everything (V2X)-capable entities, capable of providing V2X information, is determined along one or more portions of each respective route. The method then includes generating a navigation map in an in-vehicle display, with the navigation map comprising each route of the plurality of routes and an indication of the availability of V2X-capable entities along the one or more portions of each respective route. The method also includes causing the navigation map to be displayed in the in-vehicle display.

In some embodiments, the method may further include selecting a navigation route from the plurality of routes based on the availability of V2X-capable entities along the one or more portions of the navigation route. In some embodiments, the method may further include receiving a user selection of a navigation route from the plurality of routes and updating the navigation map in the in-vehicle display to show only the user selected navigation route. In some embodiments, the method may further include calculating a travel time estimate for each route in the plurality of routes based on the availability of V2X-capable entities along the one or more portions of each respective route. In some embodiments, calculating the travel time estimate for each route in the plurality of routes may include determining V2X-capabilities of the V2X-capable entities along each respective route.

In some embodiments, the method may further include updating the travel time estimate for each route in the plurality of routes based on the V2X-capabilities of V2X-capable entities along each respective route. In some embodiments, the method may further include ordering each route in the plurality of routes in an ordered list based on the travel time estimate for each respective route and causing the ordered list of the plurality of routes to be displayed in the in-vehicle display.

In some embodiments, the method may further include receiving a first user selection of a navigation route from the first plurality of routes and determining, based on a user event having a duration, that the navigation route will not provide sufficient V2X assistance for the duration of the user event. In some embodiments, the method may further include determining an alternative route which has available V2X assistance for autonomous driving support over the duration of the user event, and then causing the navigation map in the in-vehicle display to show an indication of the alternative route. In some embodiments, the method may further include receiving a second user selection of the alternative route and calculating a travel time estimate for the alternative route based on a greater availability of V2X-capable entities along one or more portions of the alternative route. In some embodiments, the method may further include determining an estimated change in travel time associated with the second user selection of the alternative route, with the estimated change in travel time based at least on the calculated travel time estimate for the alternative route. The in-vehicle display can then show the estimated change in travel time.

In some embodiments, the method may further include, for each route in the plurality of routes, receiving a V2X-capability and a location for each of the plurality of V2X-capable entities along the one or more portions of each respective route. In some embodiments, the method may further include, for each route in the plurality of routes, determining, from the V2X-capability and the location for each of the plurality of V2X-capable entities along the one or more portions of each respective route, an availability of assisted driving features along the one or more portions of each respective route. In some embodiments, the method may further include updating the navigation map in the in-vehicle display to show availability of assisted driving features along the one or more portions of each route in the plurality of routes.

In some embodiments, the method may further include receiving an user event, determining a navigation route from the plurality of routes having availability of V2X-capable entities along a portion of the navigation route expected to be traversed during the user event, and causing the navigation route to be displayed via the in-vehicle display. In some embodiments, the method may further include receiving an user event, determining that the user event overlaps in time with a travel time between the source address to the destination address, determining a navigation route from the plurality of routes based in part on availability of V2X-capable entities along a portion of the navigation route expected to be traversed during the user event, and causing the navigation route to be displayed via the in-vehicle display.

In some embodiments, the method may further include determining a time to start based at least on a travel time from the source address to the portion of the navigation route expected to be traversed during the user event, as well as an availability of V2X-capable entities along the portion of the navigation route expected to be traversed during the user event. The time to start can then be shown in the in-vehicle display.

In some embodiments, the method may further include receiving an user event, determining that the user event does not overlap in time with a travel time between the source address to the destination address, determining a navigation route from the plurality of routes based in part on an estimated travel time for the navigation route, and then causing the navigation route to be displayed via the in-vehicle display. In some embodiments, the method may further include receiving a first user selection of the navigation route from the plurality of routes. In some embodiments, the method may further include determining an alternative route, wherein the alternative route has a greater availability of V2X-capable entities along a portion of the alternative route expected to be traversed during the user event than the availability of V2X-capable entities along a portion of the navigation route expected to be traversed during the user event. The navigation map in the in-vehicle display can be updated to show an indication of the alternative route. In some embodiments, the plurality of V2X-capable entities includes Vehicle-to-Infrastructure (V2I) capable infrastructure or Vehicle-to-Vehicle (V2V) capable vehicles.

In various embodiments, a system is disclosed that includes a vehicle having an in-vehicle display and an on-board navigation computer, the on-board navigation computer capable of receiving communication over Vehicle-to-Everything (V2X) communication. The system may also include a navigation application executable by the on-board navigation computer to cause the on-board navigation computer to: obtain a destination address and a source address, and determine a plurality of routes from the source address to the destination address. For each route in the plurality of routes, the availability of V2X-capable entities, capable of providing V2X information, along one or more portions of each respective route is determined. The navigation application may further cause the on-board navigation computer to generate a navigation map in the in-vehicle display and cause the navigation map to be displayed in the in-vehicle display. The navigation map may comprise each route of the plurality of routes and an indication of the availability of V2X-capable entities along the one or more portions of each respective route.

In some embodiments, the navigation application is executable by the on-board navigation computer to further cause the on-board navigation computer to select a navigation route from the plurality of routes based on the availability of V2X-capable entities along the one or more portions of the navigation route. In some embodiments, the navigation application is executable by the on-board navigation computer to further cause the on-board navigation computer to calculate a travel time estimate for each route in the plurality of routes based on the availability of V2X-capable entities along the one or more portions of each respective route, and update the travel time estimate for each route in the plurality of routes based on the V2X-capabilities of V2X-capable entities along each respective route.

In various embodiments, a non-transitory computer readable memory is disclosed containing instructions executable by a processor to cause the processor to: determine a destination address and a source address, and determine a plurality of routes from the source address to the destination address. For each route in the plurality of routes, the availability of Vehicle to Everything (V2X)-capable entities, capable of providing V2X information, along one or more portions of each respective route is determined. The instructions may further cause the processor to generate a navigation map in the in-vehicle display and cause the navigation map to be displayed in the in-vehicle display. The navigation map may comprise each route in the plurality of routes and an indication of the availability of V2X-capable entities along the one or more portions of the respective route.

In some embodiments, the instructions are executable by the processor to further cause the processor to select a navigation route from the plurality of routes based on the availability of V2X-capable entities along the one or more portions of the navigation route. In some embodiments, the instructions are executable by the processor to further cause the processor to calculate a travel time estimate for each route in the plurality of routes based on the availability of V2X-capable entities along the one or more portions of each respective route, and update the travel time estimate for each route in the plurality of routes based on the V2X-capabilities of V2X-capable entities along the respective route.

In various embodiments, an apparatus is disclosed that includes means for obtaining a destination address and a source address, means for determining a plurality of routes from the source address to the destination address, means for, for each route of the plurality of routes, determining an availability of Vehicle to Everything (V2X)-capable entities capable of providing V2X information, along one or more portions of each route, means for generating a navigation map for display in an in-vehicle display, the navigation map comprising each route of the plurality of routes and an indication of the availability of V2X-capable entities along the one or more portions of each respective route, and means for causing the navigation map to be displayed in the in-vehicle display.

In some embodiments, the apparatus further includes means for calculating a travel time estimate for each route in the plurality of routes based on the availability of V2X-capable entities along the one or more portions of each respective route. In some embodiments, the apparatus further includes means for ordering each route in the plurality of routes in an ordered list based on the travel time estimate for each route, and means for causing the ordered list of the plurality of routes to be displayed in the in-vehicle display. In some embodiments, the apparatus further includes, for each route in the plurality of routes: means for receiving a V2X-capability and a location for each of the plurality of V2X-capable entities along the one or more portions of each respective route, and means for determining, from the V2X- capability and the location for each of the plurality of V2X-capable entities along the one or more portions of each respective route, an availability of assisted driving features along the one or more portions of each respective route. In some embodiments, the apparatus further includes means for updating the navigation map in the in-vehicle display to show availability of assisted driving features along the one or more portions of each route in the plurality of routes.

DETAILED DESCRIPTION OF THE INVENTION

Figure 1:
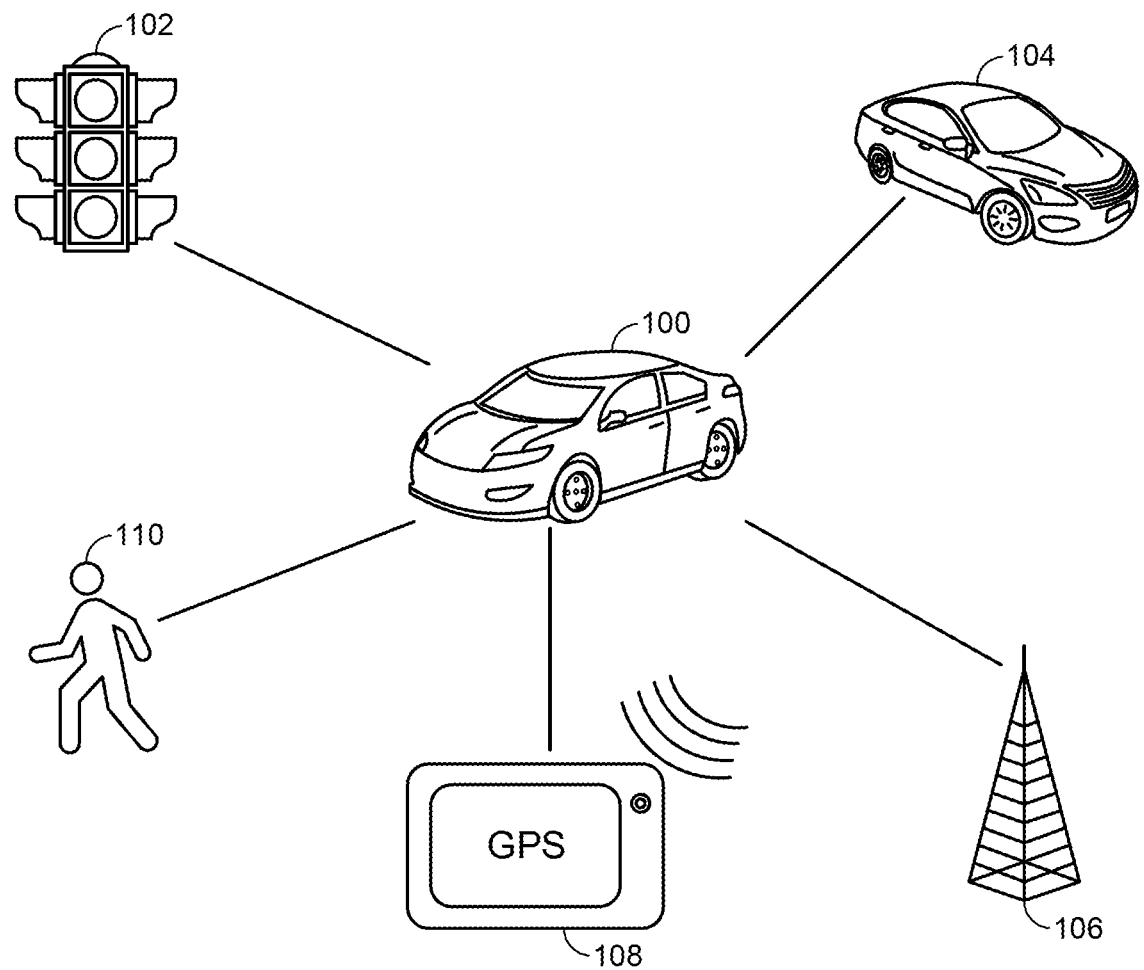
FIG. 1 is a system diagram illustrating the various V2X-capable entities that supplemental information can be received from, in accordance with embodiments of the present disclosure.

Vehicle-to-Everything (V2X) communication involves passing information between a vehicle and any other entity that may affect or be affected by the vehicle. Examples of such entities may include infrastructure (e.g., a stop light), pedestrians, other vehicles, and so forth. Thus, V2X is a rather broad vehicular communication system. In some embodiments, V2X may encompass other more specific types of communication such as Vehicle-to-Infrastructure (V2I), Vehicle-to Vehicle (V2V), Vehicle-to-Pedestrian (V2P), Vehicle-to-Device (V2D), Vehicle-to-Grid (V2G), and so forth.

Vehicle-to Vehicle (V2V) is a communication model designed to allow vehicles or automobiles to "talk" to each other, typically by having the automobiles form a wireless ad hoc network on the roads. Vehicle-to-Infrastructure (V2I) is a communication model that allows vehicles to share information with the components that support a road or highway system, such as overhead radio-frequency identification (RFID) readers and cameras, traffic lights, lane markers, streetlights, signage and parking meters, and so forth. Similar to V2V communication, V2I communication is typically wireless and bi-directional: data from infrastructure components can be delivered to the vehicle over an ad hoc network and vice versa. Vehicle-to-Pedestrian (V2P) communications involves a vehicle or automobile being able to communicate with, or identify a broad set of road users including people walking, children being pushed in strollers, people using wheelchairs or other mobility devices, passengers embarking and disembarking buses and trains, and people riding bicycles. Vehicle-to-Device (V2D) communications consists in the exchange of information between a vehicle and any electronic device that may be connected to the vehicle itself. Vehicle-to-Grid (V2G) communication may include a vehicle communicating with an electric power grid.

These more specific types of communication are useful for fulfilling various functions. For instance, Vehicle-to-Vehicle (V2V) is especially useful for collision avoidance safety systems, while Vehicle-to-Pedestrian (V2P) is useful for safety alerts to pedestrians and bicyclists. Vehicle-to-Infrastructure (V2I) is useful for optimizing traffic light control and issuing speed advisories, while Vehicle-to-Network (V2N) is useful for providing real-time traffic updates/routing and cloud services.

As referred to herein, V2X communications may include any of these more specific types of communication, as well as any communications between a vehicle and another entity that do not fall under one of these existing communications standards. Thus, V2X is a rather broad vehicular communication system.

Traditionally, V2X communication has been based on Institute of Electrical and Electronics Engineers (IEEE) 802.11 wireless local area network (WLAN) technology, with vehicles and entities (e.g., V2X senders) communicating through an ad-hoc network that is formed as two V2X senders come into range with each another. However, cellular-based solutions also exist, such as LTE-based V2X, which are capable of leveraging that technology to provide secure communication, precise positioning, and efficient processing.

One benefit of V2X communication is safety. For instance, V2X communication can enable a vehicle to communicate with its surroundings, such that the vehicle can increase driver awareness and provide driving assistance to the driver. For instance, the vehicle may be aware of other moving vehicles and pedestrians on the road. The vehicle can then communicate their locations to the driver, who may be unaware. If accidents are avoided this way, then the safety of the other vehicles and pedestrians on the road is improved. This is just one use case for V2X for improving safety. Other examples of V2X use cases directed to safety include forward collision warning, lane change warning/blind spot warning, emergency electric brake light warning, intersection movement assist, emergency vehicle approaching, road works warning, and platooning.

The V2X communication standard also aims to develop an Advanced Driver Assistance System (ADAS), which helps the driver make critical decisions when it comes to lane changing, speed changing, overtaking speed, and so forth. ADAS can assist driving in challenging conditions, such as bad weather, low lighting, low visibility, and so forth. ADAS can also be used for non-line-of-sight sensing, overtaking (e.g., passing other vehicles on the road), cooperative driving, and do not pass (DNP) alerts.

In the future, the V2X communication standard will provide assistance in three modes. First, V2X can increase driver awareness. For example, the vehicle can use its knowledge of the positions of the various other vehicles on the road in order to provide the driver a bird's eye view of an intersection, or to provide the driver with see-through capability when driving behind a truck (e.g., the vehicle will visually display to the driver the other vehicles on the other side of the truck that are obscured by the truck). Second, V2X can provide cooperative driving and collision avoidance. For example, V2X can be used for platooning to tightly group vehicles on the road by enabling those vehicles to communicate and accelerate/brake simultaneously. V2X can also be used for regulating vehicle speed or overtake negotiation, in which a vehicle is able to signal its intent to overtake other vehicles in order to secure the overtaking situation. Third, V2X can provide full-blown autonomous driving.

However, in order for V2X to enable these types of uses, large amounts of information of varying types will need to be shared between vehicles and entities. This is problematic because it typically requires the deployment of V2X-capable vehicles, V2X-capable pedestrians, V2X-capable infrastructure (e.g., traffic lights, building tops, and so forth), and so forth. In other words, the above V2X use cases would require an existing, critical mass of V2X-capable vehicles and entities already on the road.

In various embodiments disclosed herein, a crowdsourcing approach is taken for providing information needed for these V2X use cases. The crowdsourced information can be supplemented into existing navigation applications (e.g., used by V2X-capable vehicles). Using that information, drivers and/or autonomous vehicles may be informed about the relative availability of V2X-capable entities in various possible routes from a source address to a destination address. Thus informed, drivers and/or autonomous vehicles can choose a certain route where high assistance is available or a greater portion of the distance along the route is autonomous capable (e.g., there is a critical mass of V2X-capable vehicles along that route) or alternatively choose a route with less autonomous capability. The supplemental information can also be used to help drivers and/or autonomous vehicles make decisions on route selection (e.g., picking the routes where there is a critical mass of V2X-capable vehicles).

FIG. 1 is a system diagram illustrating the various V2X-capable entities that supplemental information can be received from.

In some embodiments, a vehicle 100 may be able to communicate with infrastructure 102 (e.g., a traffic light) using Vehicle-to-Infrastructure (V2I) communication. In some embodiments, the vehicle 100 may be able to communicate with other vehicles on the road, such as vehicle 104, via Vehicle-to Vehicle (V2V) communication.

In some embodiments, the vehicle 100 may be able to communicate with a power grid 106 via Vehicle-to-Grid (V2G) communication. In some of such embodiments, the vehicle 100 may be a plug-in electric vehicle, such as an electric car (PEV), a plug-in hybrid electric vehicle (PHEV), or hydrogen fuel cell electric vehicle (FCEV). In some embodiments, the vehicle 100 may be able to communicate with the power grid 106 in order to indirectly communicate with other vehicles plugged into the power grid 106 (e.g., parked electric vehicles) or to obtain information about those other vehicles from the power grid 106.

In some embodiments, the vehicle 100 may be able to communicate with device 108 via Vehicle-to-Device (V2D) communication. In some of such embodiments, the device 108 may be any electronic device that may be connected to the vehicle itself. For example, the device 108 may be a third party or on-board GPS navigation device, which the vehicle 100 can communicate with to obtain information available to the device 108. If the GPS navigation device had information regarding congested routes, traffic density, the location of other vehicles on the road with similar devices, and so forth, the vehicle 100 may be able to obtain all that information.

In some embodiments, the vehicle 100 may be able to detect pedestrian 110 via Vehicle-to-Pedestrian (V2P) technology. For instance, the vehicle 100 may have a detection method such as cameras or sensors that allow the vehicle 100 to detect and confirm the presence of pedestrian 110 on the road. Pedestrian 110 may encompass a broad set of people, including people walking, children being pushed in strollers, people using wheelchairs or other mobility devices, passengers embarking and disembarking buses and trains, people riding bicycles, and so forth.

The availability of ADAS features will often depend on the information available from the multiple data sources. The information available may, in turn, indirectly depend on the selected route that is being traveled. Thus, the selected route will often dictate the availability of ADAS features. For instance, autonomous driving functionality may only be enabled if information can be received from a critical mass of V2X-capable entities along the selected route. This means that route selection and navigation can play a role in dictating driving safety, driving efficacy, and travel time. The availability of ADAS features can also be mapped out along various routes between a source and destination and used to provide an accurate assessment of the travel time for each of those routes. These factors can then be considered during the route selection and navigation process.

In some embodiments, the vehicle 100 may also be able to receive information from a network or server (not shown). The vehicle 100 may be able to communicate with the network and server to receive information about the locations and capabilities of infrastructure 102, vehicle 104, power grid 106, and/or pedestrian 110 without having to communicate with those entities directly.

Figure 2A:
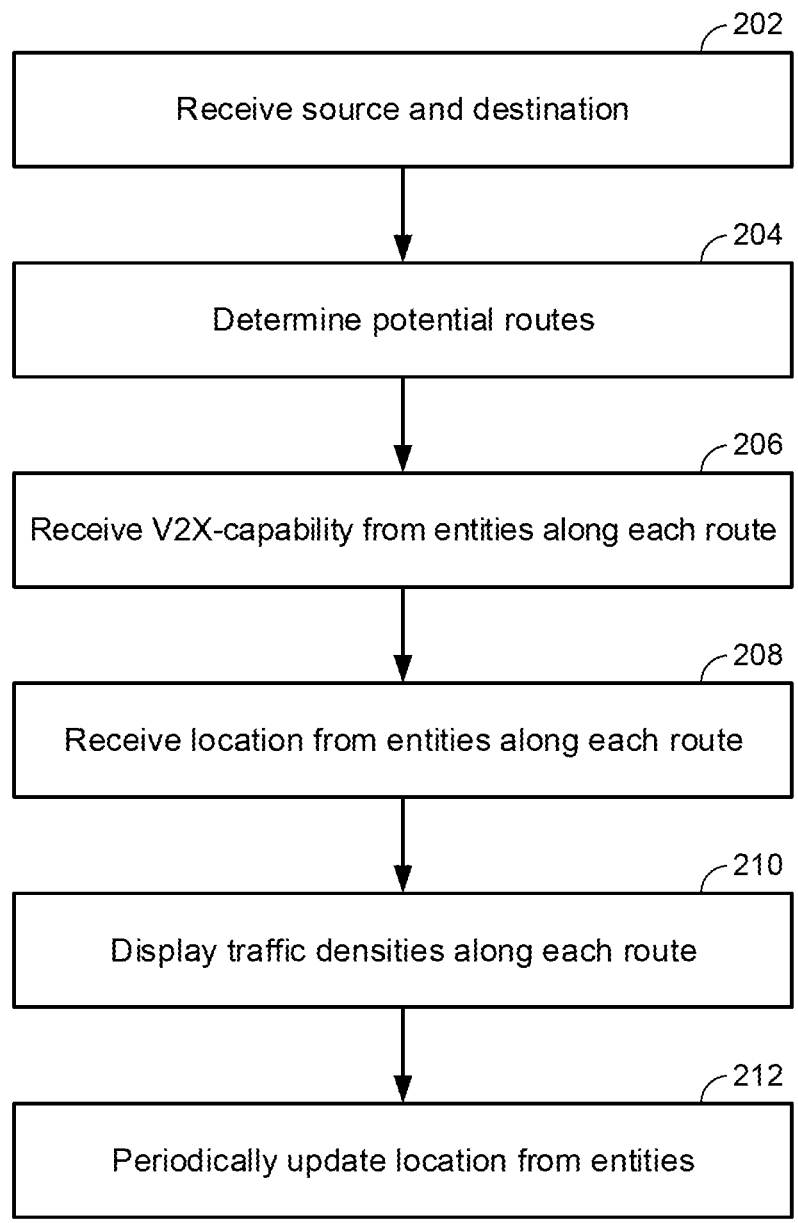
FIG. 2A is a flow chart illustrating how supplemental information from V2X-capable entities can be used to display traffic densities for route selection, in accordance with embodiments of the present disclosure.

FIG. 2A is a flow chart illustrating how supplemental information from V2X-capable entities can be used to display traffic densities for route selection. More specifically, FIG. 2A illustrates a first example use case for the supplemental information obtained from V2X-capable entities.

At block 202, the vehicle's on-board computer and navigation system may receive an input of a source and a destination from the user. For example, the driver may input a source address (e.g., for their home) and a destination address (e.g., the location the driver is attempting to go) into a touch-screen display in the vehicle.

At block 204, the vehicle's on-board computer and navigation system may determine potential routes between the source and the destination. For instance, it may be determined that there are three primary routes to get from the driver's house to the location the driver is attempting to go.

At block 206, the vehicle's on-board computer and navigation system may receive the V2X-capabilities from the entities along each route, while at block 208, the vehicle's on-board computer and navigation system may receive the locations (e.g., GPS coordinates) of those entities along each route. V2I-capable infrastructure can crowdsource their capability along with their tagged static location. Other V2X-capable entities can also crowdsource their V2X capabilities to a central server. Moving vehicles can crowdsource their location and send information about their V2X-capability. Static, non-moving entities or infrastructure (the locations of which the vehicle may already be aware of) can just update their V2X-capabilities. In some embodiments, all of this information can be sent using LTE-based V2X communication.

In some embodiments, the vehicle does not necessarily need to communicate with the entities along each route. Instead, the vehicle may be able to, for each route in the plurality of routes, determine an availability of Vehicle to Everything (V2X)-capable entities capable of providing V2X information along one or more portions of each respective route. The vehicle may obtain this information from a central network or server that is kept up-to-date. For instance, the V2X-capable entities may periodically update the central network or server with their location and/or capabilities and the central network or server may keep an updated log of these locations and capabilities. When the vehicle requests information along a specific route, the central network or server may retrieve the locations and capabilities of V2X-capable entities from the updated log along the route and send it to the vehicle to determine the availability of Vehicle to Everything (V2X)-capable entities capable of providing V2X information along one or more portions of each respective route. For static entities (e.g., non-moving infrastructure), a static coverage map may be maintained by the vehicle and/or the central network or server. In the latter case, the central network or server may maintain an updated static coverage map and be able to provide the availability information for the static V2X-capable entities by request.

At block 210, the vehicle's on-board computer and navigation system may assess the locations and amounts of V2X-capable entities along each of the potential routes in order to show the traffic densities along those routes (e.g., displayed on the touch-screen display). This will help the user identify routes or paths with high vehicular traffic.

At block 212, for moving V2X-cable entities (like vehicles, pedestrians, and so forth), their locations, speed, and so forth can be periodically reported to the vehicle's on-board computer and navigation system to allow the displayed traffic densities to be updated over time.

Figure 2B:
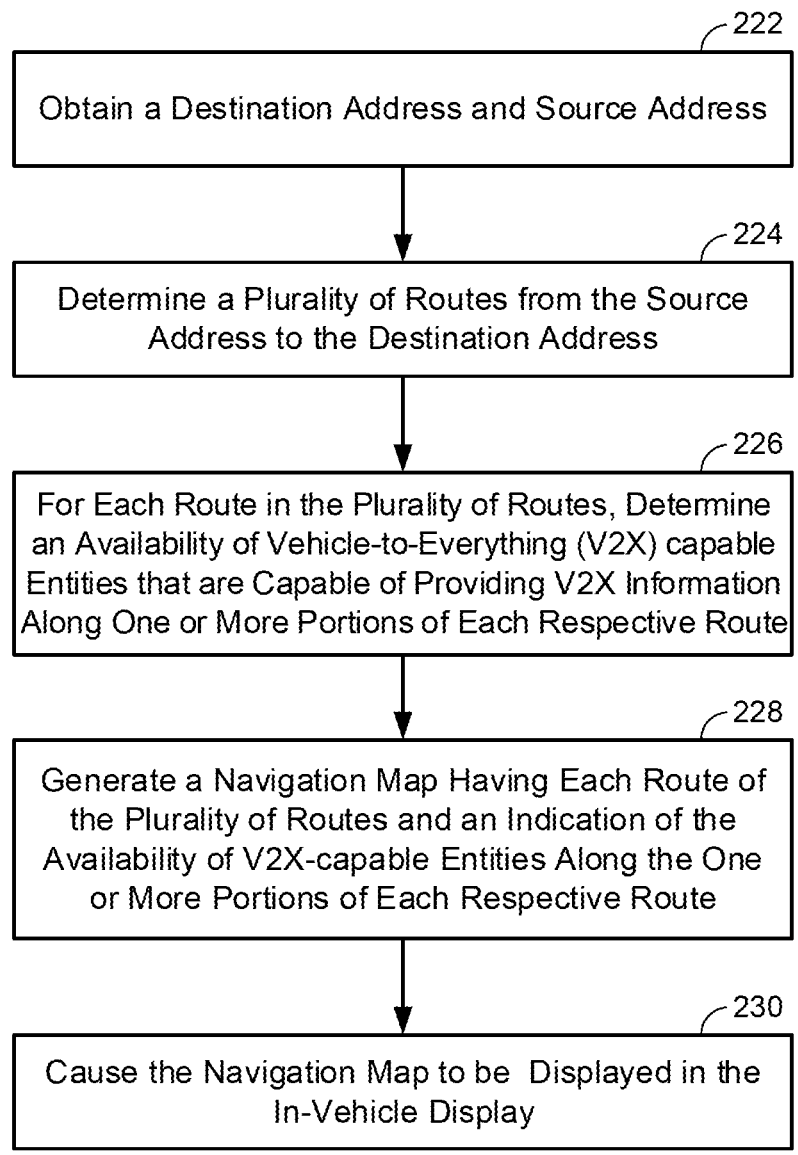
FIG. 2B is a flow chart illustrating how availability of V2X-capable entities along a route can be displayed, in accordance with embodiments of the present disclosure.

FIG. 2B is a flow chart illustrating how availability of V2X-capable entities along a route can be displayed, in accordance with embodiments of the present disclosure.

At block 222, the vehicle's on-board computer and navigation system may obtain a destination address and a source address. Aspects of block 222 can be similar to those described above regarding block 202 with reference to FIG. 2A. Means for performing the functionality of block 222 can, but not necessarily, include, for example, user interface 750 with reference to FIG. 7. In some embodiments, a user may be able to enter a source address or the destination via the user interface 750 shown in the in-vehicle display. This can be done via the keypad 754, or in some cases, the display 756 which may be a touch screen that allows the user to provide inputs via a displayed keyboard. In some embodiments, the vehicle's on-board computer and navigation system may obtain a destination address or a source address without needing the user's direct input. For instance, with reference to FIG. 7, the satellite positioning system (SPS) receiver 708 may be used to receive satellite-based positioning of the vehicle. This information can be used, in conjunction with the map application 732, in order to determine an address nearby to the vehicle that can be used as the source address. Regarding the destination address, in some embodiments, the navigation system may be synchronized with a user's calendar application on their mobile phone or personal computer, which may have information about an address associated with a meeting or appointment scheduled by the user. The navigation system may be able to determine that the user is likely on their way to this scheduled meeting or appointment and then use the associated address as the destination address.

At block 224, the vehicle's on-board computer and navigation system may determine a plurality of routes from the source address to the destination address. Aspects of block 224 can be similar to those described above regarding block 204 with reference to FIG. 2A. It is understood that the plurality of routes determined from the source address to the destination address may include a plurality of routes that is a subset of an even larger number of routes from the source address to destination address. In one example, the plurality of routes can include two routes or greater than two routes. Means for performing the functionality of block 224 can, but not necessarily, include, for example, the map application 732 with reference to FIG. 7. For instance, the map application 732 may have access to a server with various routes or the routes may be stored in an internal database. Upon receiving the source address and the destination address, the navigation system may direct the map application 732 to determine all the available routes connecting the source address and the destination address. If a particular route is clearly infeasible (e.g., takes extraneous time or is closed off for construction), that route may be omitted from the plurality of routes.

At block 226, the vehicle's on-board computer and navigation system may, for each route in the plurality of routes, determine an availability of Vehicle-to-Everything (V2X)-capable entities capable of providing V2X information, along one or more portions of each respective route. Aspects of block 226 can be similar to those described above regarding blocks 206 and 208 with reference to FIG. 2A. It is understood that, as noted above, in some circumstances, the plurality of routes may be a subset of a larger number of routes, and that, as such, each route in the plurality of routes need not include each route of the larger number of routes. Means for performing the functionality of block 226 can, but not necessarily, include, for example, the wireless wide area network (WWAN) transceiver 704, the WLAN Transceiver 706, and the map application 732 with reference to FIG. 7. For instance, the navigation system may communicate with nearby V2X-capable entities using either the WWAN Transceiver 704 or WLAN Transceiver 706, in order to learn the locations of those nearby V2X-capable entities. Once the locations of those V2X-capable entities are known, their locations can be individually mapped out along the various routes in the plurality of routes by the map application 732. This would provide the navigation system with knowledge of the location and availability of V2X-capable entities along each route.

At block 228, the vehicle's on-board computer and navigation system may generate a navigation map for display in an in-vehicle display, the navigation map comprising each route of the plurality of routes and an indication of the availability of V2X-capable entities along the one or more portions of the respective route. Means for performing the functionality of block 228 can, but not necessarily, include, for example, the processor 710 operating the map application 732, with reference to FIG. 7.

At block 230, the vehicle's on-board computer and navigation system may cause the navigation map to be displayed in the in-vehicle display. Means for performing the functionality of block 230 can, but not necessarily, include, for example, the processor 710 providing instructions for the navigation map to be shown in display 756, with reference to FIG. 7.

Figure 3:
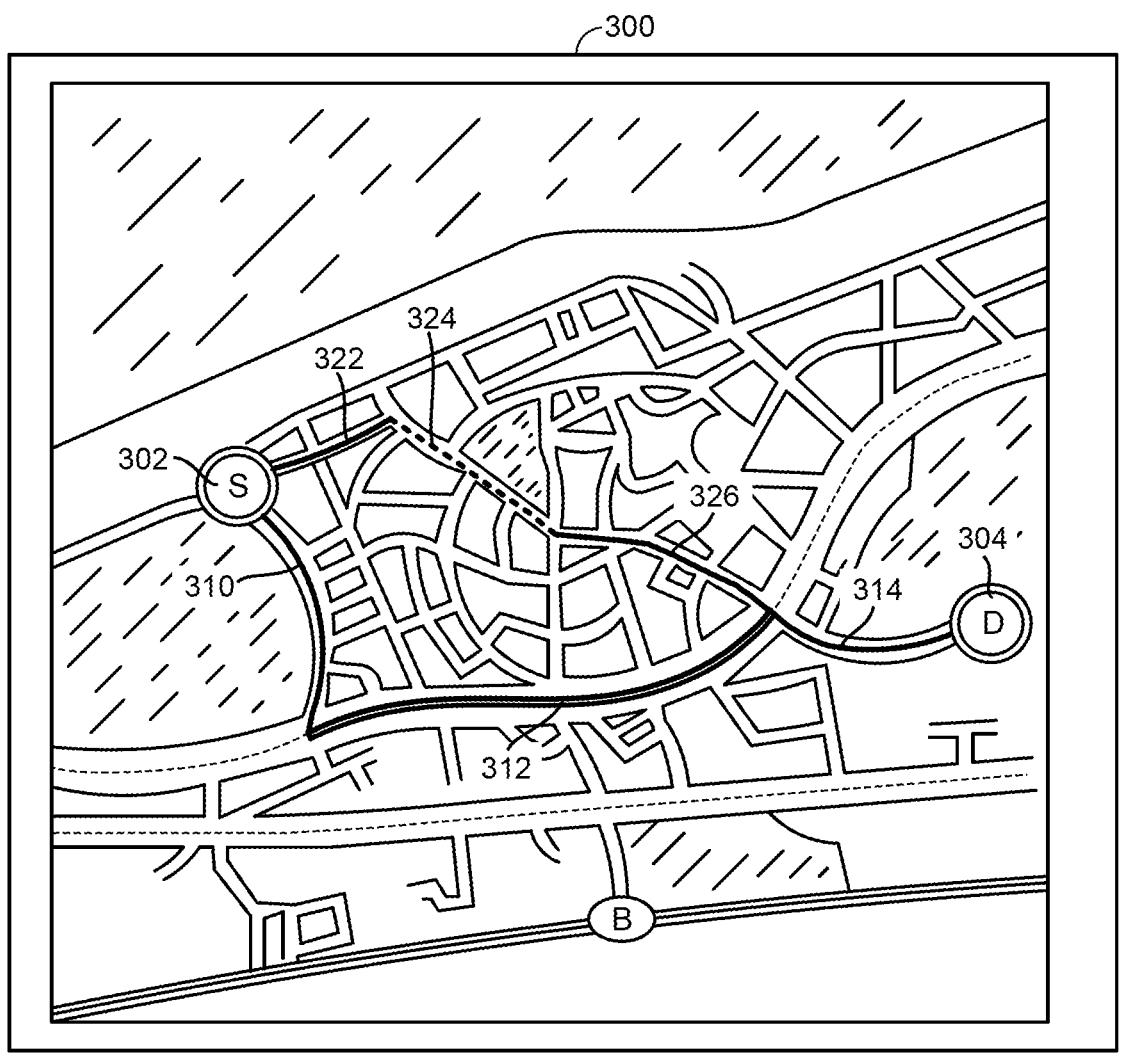
FIG. 3 is an example user interface of a street-level navigation map demonstrating how supplemental information from V2X-capable entities can be used to display available ADAS features for route selection, in accordance with embodiments of the present disclosure.

FIG. 3 is a street-level navigation map illustrating how supplemental information from V2X-capable entities can be used to display available ADAS features for route selection. More specifically, FIG. 3 illustrates a second example use case for the supplemental information obtained from V2X-capable entities.

As in the flowchart depicted in FIG. 2A, a V2X-capable vehicle can receive supplemental information comprising of V2X capabilities and locations of V2X-capable entities along various potential routes. However, in addition to displaying traffic density in the navigation map (e.g., in the in-vehicle display), the vehicle can use the supplemental information from crowdsourcing to supplement a navigational map with the available ADAS features along each route. Various routes on the navigational map can be differentially highlighted. For instance, different patches of each route from source to destination can be supplemented with a color coding scheme based on the supplemental information available for that route. Alternatively, the capabilities along each of the routes can be distinguished based on width, style, and so forth.

For example, some routes or parts of routes may be highlighted as 'autonomous capable,' if those parts of routes are heavily or densely populated with V2X-capable entities as reported by static V2I-capable infrastructure, moving V2X-capable vehicles, and so forth. In other words, if the amount of V2X-capable entities along that route is sufficient for the vehicle to be well-informed of potential hazards and obstacles, then the vehicle may allow for autonomous driving along that route. Once the user selects that route, the user may be able to handover the vehicle in autonomous mode.

As another example, some routes or parts of routes may be highlighted as 'partial autonomous/assistance only', if those parts of routes are only thinly populated with V2X-capable entities as reported by static V2I-capable infrastructure, moving V2X-capable vehicles, and so forth. Along this route, the user may take manual control of the vehicle where autonomous assistance is not fully supported, but may receive ADAS capabilities to support easier driving where supported.

As yet another example, some routes or parts of routes may be highlighted as 'no assistance', if those parts of routes have few or no V2I-capable infrastructure, moving V2X-capable vehicles, and so forth. Along these routes, the user would have to take full manual control of the vehicle and would not receive any ADAS support from the vehicle.

FIG. 3 illustrates an example navigation map 300 that would be displayed in an in-vehicle display. The navigation map 300 shows street-level routes between the source 302 and the destination 304. Two potential routes are presented in navigation map 300. The first route involves path 310, path 312, and path 314. The second route involves path 322, path 324, path 326, and path 314.

In the embodiment shown, the width of the paths corresponds to the level of ADAS support along that path. For example, path 312 is the thickest, which may correspond to 'autonomous capable'. Since path 312 is a highway and has a high level/density of V2X-capable entities it is able to support autonomous driving over path 312. Paths 310, 322, 326, and 314 are all of medium thickness, which may correspond to 'partial autonomous/assistance only' since the user would have to take manual control of the vehicle, but certain ADAS capabilities are available to support easier driving. Finally, path 324 is the thinnest and corresponds to 'no assistance'. Due to path 324 having few or no V2X-capable entities, the user would have to take full manual control of the vehicle and would not receive any ADAS support from the vehicle. Hence, in this illustrated embodiment, as one example, the thickness of the displayed path can comprise an indication of the availability of V2X-capable entities along one or more portions of each respective route.

Thus, from looking at navigation map 300, the user would have additional information to make a decision between two different routes. The user could opt to take the first route that contains path 312, which has autonomous driving capability to make the drive easier. However, that path is not as direct and could potentially take longer. Alternatively, the user could opt to take the second route which offers a more direct path between the source 302 and the destination 304, but the second route has much more limited ADAS capabilities (including path 324, which would offer zero ADAS support).

Figure 4:
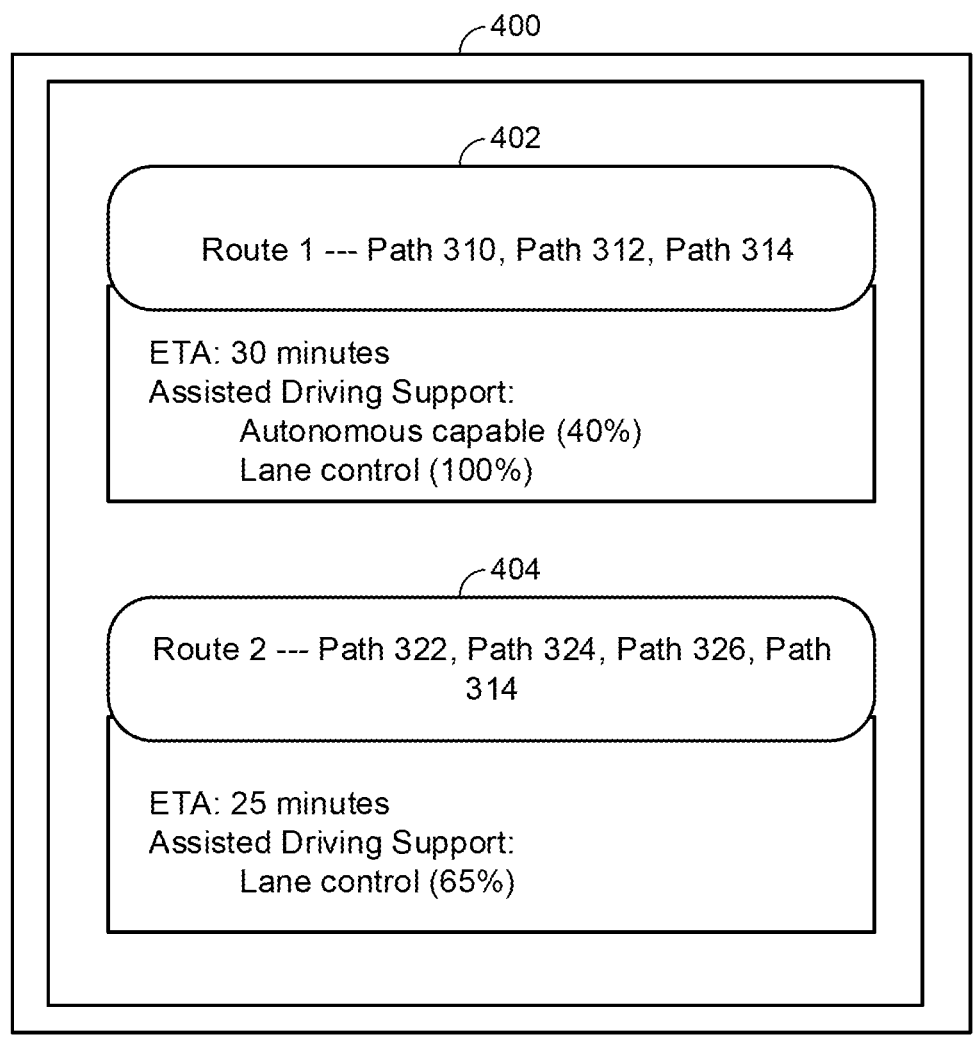
FIG. 4 is an example user interface of a route selection screen demonstrating how supplemental information from V2X-capable entities can be used to determine available ADAS features for route selection, in accordance with embodiments of the present disclosure.

FIG. 4 is a route selection screen illustrating how supplemental information from V2X-capable entities can be used to determine available ADAS features for route selection. More specifically, FIG. 4 illustrates a third example use case for the supplemental information obtained from V2X-capable entities.

In some embodiments, while a user searches (e.g., within the navigational map shown on the in-vehicle display) for possible routes between a source and destination, previously-proposed routes can be used for generating suggested routes for the user to take based on V2X-capabilities.

For instance, multiple paths can be presented to the user and they can be listed in an order that is based on the 'time to destination' for each route (e.g., a list in descending order from fastest route to slowest route), and, additionally or alternatively, in the order of 'assistance available' for each route (e.g., a list in descending order from routes with the most driving assistance to routes with the least driving assistance). Hence, the method described with reference to FIG. 2B can further include ordering each route in an ordered list based on, for example, the travel time estimate for each route or level of available assistance for each route and causing the ordered list of the plurality of routes to be displayed in the in-vehicle display. In one example, the user may be able to select whether to order or sort the list by estimated travel time or level of available assistance. A user may be able to use the ordered list in order to, for example, select a path that is relatively longer (e.g., takes a longer time to reach the destination) but has relatively better driving assistance available to make the drive easier and safer.

Furthermore, this information can be used to determine a best path based on 'time to destination' more accurately. Multiple paths with similar distance and vehicular density, which would previously be estimated to have similar times to destination, may actually have different drive times based on the availability of 'assisted driving' support available for each path. A path with more 'assisted driving' support may be more efficient than other paths of similar distance and vehicular density.

For instance, in FIG. 4, an example navigation screen 400 would be displayed in an in-vehicle display. This navigation screen 400 may be associated with the navigation map 300 of FIG. 3. In various embodiments, navigation screen 400 can display the various routes in decreasing order of travel time (e.g., expressed as an estimated time of arrival (ETA)) or, as in the figure, in decreasing order of available ADAS features. Thus, navigation screen 400 shows a selectable button 402 for the first route shown in navigation map 300 and a selectable button 404 for the second route shown in navigation map 300. The navigation screen 400 further informs the user that the first route has an ETA of 30 minutes but higher availability of assisted driving support in comparison to the second route, which has an ETA of 25 minutes but much more limited assisted driving support. If the user selects the selectable button 404 (e.g., the user prefers the first route even though the distance is longer due to the availability of ADAS features), then the first route will be selected and used for navigation.

More specifically, the navigation screen 400 in FIG. 4 illustrates the details associated with the first route (involving paths 310, 312, 314) shown in navigation map 300 of FIG. 3, and also details associated with the second route (involving paths 322, 324, 326, and 314) shown in navigation map 300 of FIG. 3. Route 1, which includes path 312 (e.g., a major road or highway that would have many V2X-capable vehicles), may be expected to have more ADAS features. For instance, the density of V2X-capable vehicles in path 312 may be sufficient to provide autonomous capability (e.g., the vehicle can drive itself) along path 312. This is reflected in the navigation screen 400 which displays route 1 having 40% autonomous capability, suggesting that autonomous capability is available for 40% of route 1. Additionally, all of the paths taken in route 1 may have sufficient V2X-capable vehicles and/or lane markings (e.g., painted on the road) to provide lane control (e.g., the vehicle recognizes marked lanes and other vehicles in other lanes, in order to provide assistance to the driver by staying within the current lane). This may be reflected in the navigation screen 400 which displays route 1 having 100% lane control capability, suggesting that lane control is available for the entire span of route 1. In comparison, route 2 may involve less-trafficked routes with lower numbers of V2X-capable vehicles, which may result in less ADAS features. For instance, the entirety of route 2 may not have sufficient V2X-capable vehicles to provide autonomous capability. Additionally, path 324 in route 2 could be a narrow unmarked street with very little traffic, for which a feature like lane control would be unavailable. Accordingly, this may be reflected in the navigation screen 400 which displays route 2 having 65% lane control capability, suggesting that lane control is available only for 65% of route 2.

Figure 5:
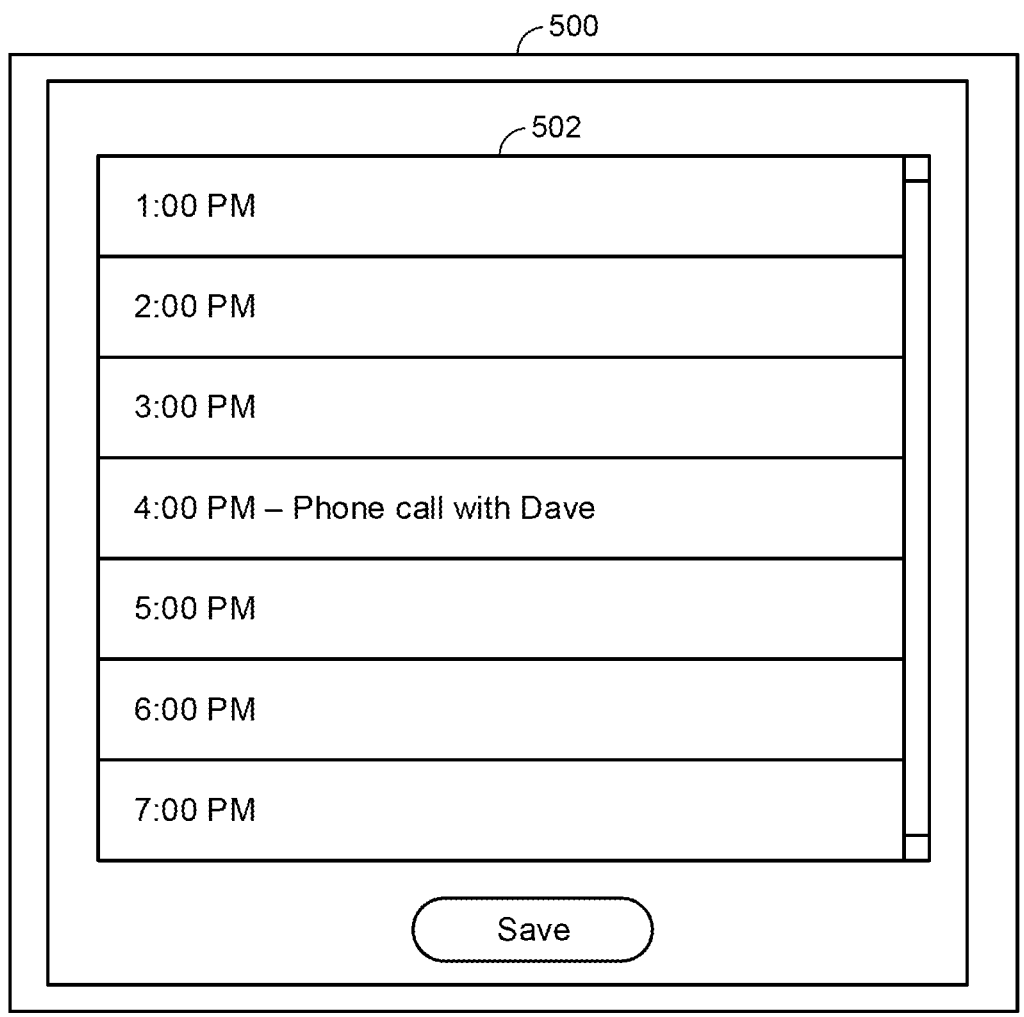
FIG. 5 is an example user interface of a scheduling screen demonstrating how supplemental information from V2X-capable entities can be used for route selection and timing, in accordance with embodiments of the present disclosure.

FIG. 5 is a scheduling screen illustrating how supplemental information from V2X-capable entities can be used for route selection and timing. More specifically, FIG. 5 illustrates a fourth example use case for the supplemental information obtained from V2X-capable entities.

In some embodiments, the supplemental information received from V2X-capable entities can be directly used by users. For instance, users can use this information to plan other activities, such as attending meetings, having meals on paths with full autonomous support available, and so forth. Users can provide additional information (meeting time, preferable meal time, and so forth), which the navigation application in the in-vehicle computer can use to suggest routes where fully autonomous driving is available during those requested times. In addition, the navigation application may use crowdsourced real-time data and past data in order to suggest a 'time to start' such that higher autonomous assistance is available.

For instance, in FIG. 5, an example scheduling screen 500 would be displayed in an in-vehicle display. The scheduling screen 500 may have a list of times 502 for which the user can input their schedule for the day. As shown in the figure, the user has set aside 4:00 PM for a phone call.

In some embodiments, the in-vehicle computer may be able to sync with a user's mobile device (e.g., a computer, tablet, smart phone, and so forth) and receive the user's schedule or calendar from the user's mobile device. For instance, the user may manage their schedule through an application on their smart phone, and the in-vehicle computer may be able to interface with that application to obtain the user's schedule. In some embodiments, the user's existing schedule can then be used to populate scheduled times the scheduling screen (e.g., scheduling screen 500) and the user may be able to make additional adjustments via the scheduling screen displayed in the in-vehicle display.

Figure 6:
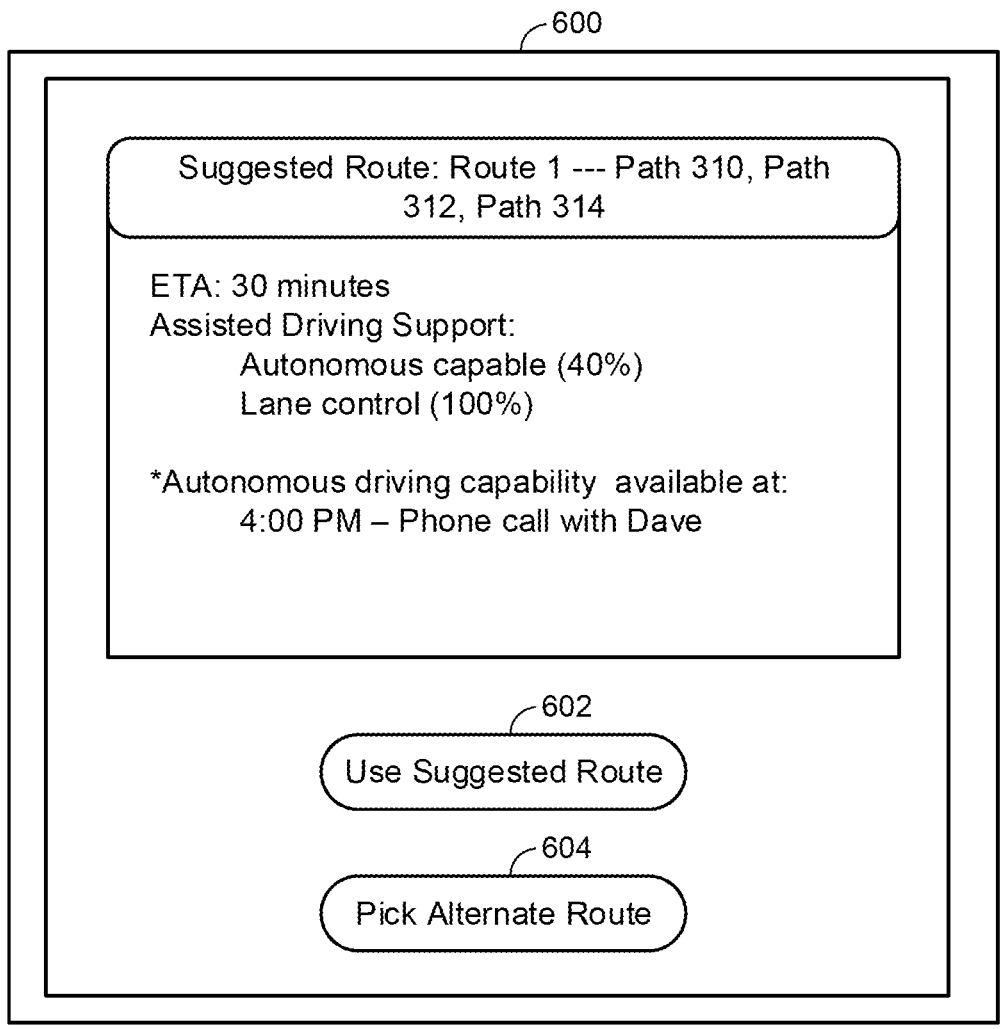
FIG. 6 is an example user interface of a navigation screen for providing a route suggestion based on the user's schedule and the supplemental information obtained from V2X-capable entities, in accordance with embodiments of the present disclosure.

With this knowledge, the navigation application in the in-vehicle computer can suggest routes where fully autonomous driving will be available during the 4:00 PM timeslot. This extended feature can be seen in FIG. 6, which shows a navigation screen 600 that provides a route suggestion based on the user's schedule and the supplemental information obtained from V2X-capable entities. The navigation screen 600 suggests the first route (e.g., shown in navigation map 300) because there is autonomous driving capability that can coincide with the user's 4:00 PM scheduled phone call. This allows the user to take the phone call at that time while autonomous driving is engaged, thereby reducing the likelihood of accidents (e.g., from the user manually driving and talking on the phone at the same time). In some embodiments, the navigation application may use crowdsourced real-time data and past data in order to suggest a start time for the trip such that the availability of fully autonomous driving will coincide with the 4:00 PM timeslot.

In some embodiments, the navigation application may determine a suggested route by taking into account both (1) information relevant to V2X-assisted driving (e.g., application information, user calendar information, and so forth), and (2) the supplemental information obtained from V2X-capable entities (e.g., V2X availability). For example, if the calendar (e.g., the scheduling screen 500) shows a phone call at 4:00 pm and the drive time for the route is expected to overlap the call, then the application may choose a route with more V2X availability (e.g., a greater number of V2X-capable entities) and ADAS features. But if there is not such a meeting on the calendar, the application may instead choose a route with a shorter drive time. Thus, the system or application may be smart enough to choose optimal routes based on the context: when the user is likely to prefer assisted driving, then V2X availability and ADAS features are prioritized in route selection, whereas when the user is likely to prefer less driving assistance, other factors such as driving time can be prioritized in route selection.

In some embodiments, the navigation application may perform route selection by weighting different factors based on the context. For instance, if the calendar (e.g., the scheduling screen 500) shows a phone call at 4:00 pm and the drive time for the route is expected to overlap the call, then the application may be weighted towards choosing a route with more V2X availability (e.g., a greater number of V2X-capable entities) and ADAS features. However, the application will continue to look at other factors while making the decision. For instance, the application may not necessarily select a route with more V2X availability if it takes significantly longer than all of the routes. If there is not such a meeting on the calendar, the application may instead be weighted towards choosing a route with shorter travel times. However, in this case the application would also continue to look at other factors while making the decision.

For instance, the application may select a route with a slightly greater travel time if there is significantly more V2X availability.

In some embodiments, the navigation application may consider a user profile along with the user's preferences and tendencies for route selection purposes. For example, a certain user may be confident in their own driving abilities and never use autonomous driving or other ADAS features, even when they're available. This preference can be specified and saved in the user's profile, or the application may pick up on it based on the patterns in the routes that the user has selected historically. The application may then select routes primarily based on other factors than ADAS support, such as minimizing driving time. In some embodiments, the user's profile, preferences, and tendencies can be combined with other information for route selection purposes. For instance, if the same user that is confident in their own driving abilities has a call scheduled at a certain time, the application may select a route with ADAS support specifically at that time without prioritizing ADAS features along other portions of the route (where travel would occur outside of the scheduled call).

In some embodiments, the user's scheduled events may be considered "user events". In some embodiments, the user's profile, preferences, and tendencies may be considered "user events." The application may consider different kinds of "user events" to weight various decision-making factors for route selection purposes.

Figure 7:
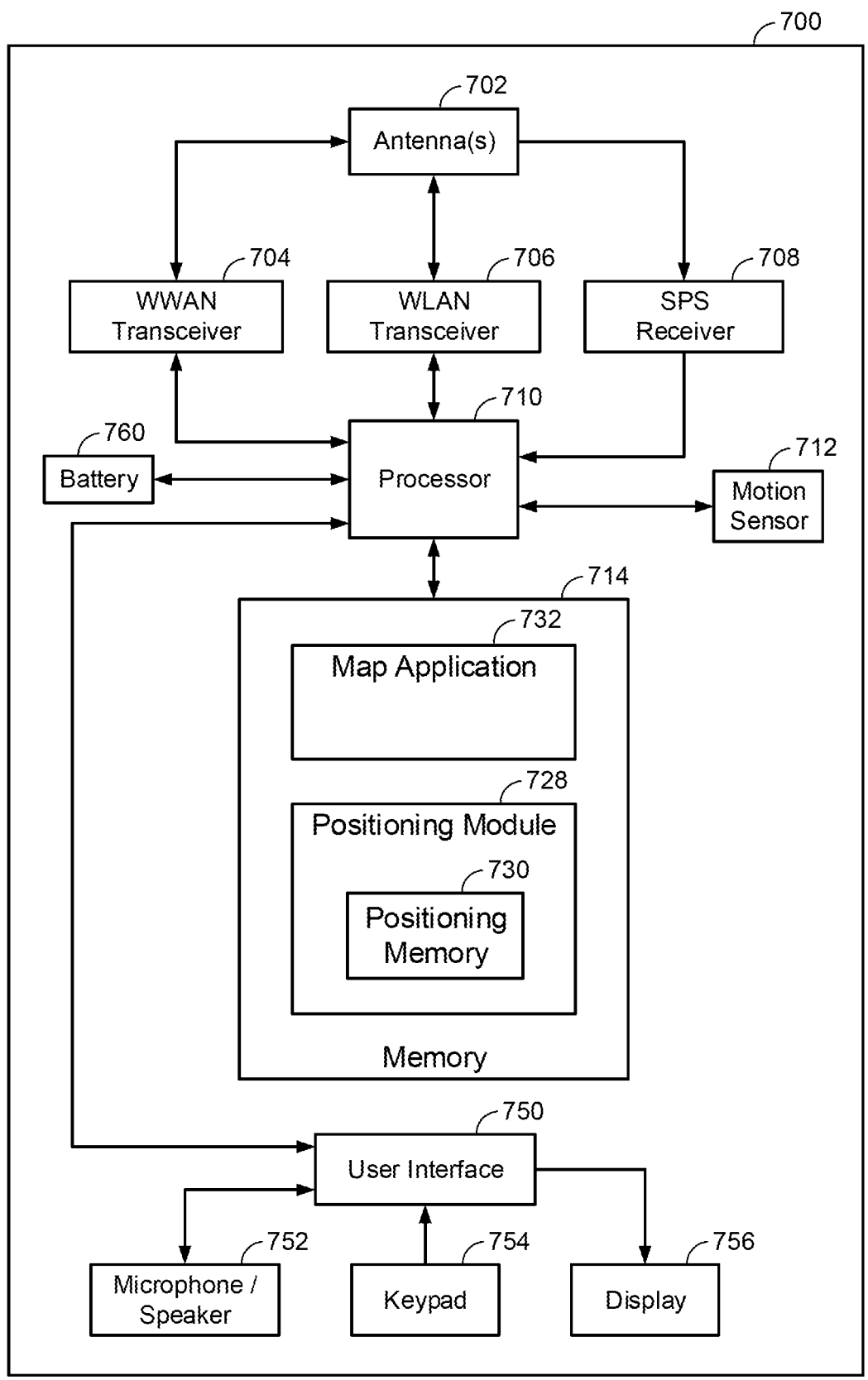
FIG. 7 is a block diagram illustrating various components of an exemplary mobile device, which is capable of providing the features offered by a navigation computer or navigation screen as described in accordance with embodiments of the present disclosure.

FIG. 7 illustrates an exemplary mobile device, for example, for communicating via Vehicle-to-Everything (V2X) communication. FIG. 7 is a block diagram illustrating various components of an exemplary mobile device 700. A vehicle, such as vehicle 100 with reference to FIG. 1, can have an in-vehicle display, such as display 756 described below, and on-board navigation computer, such as processor 710 described below. For the sake of simplicity, the various features and functions illustrated in the box diagram of FIG. 7 are connected together using a common bus, which is meant to represent that these various features and functions are operatively coupled together. Those skilled in the art will recognize that other connections, mechanisms, features, functions, or the like, may be provided and adapted as useful to operatively couple and configure an actual mobile device. Further, it is also recognized that one or more of the features or functions illustrated in the example of FIG. 7 may be further subdivided into two or more of the features or functions illustrated in FIG. 7 may be combined.

The mobile device 700 may include one or more wireless wide area network (WWAN) transceiver(s) 704 that may be connected to one or more antennas 702. The WWAN transceiver 704 comprises suitable devices, hardware, and/or software for communicating with and/or detecting signals to/from WWAN access points and/or directly with other wireless devices within a network. In one aspect, the WWAN transceiver 704 may comprise a code-division multiple access (CDMA) communication system suitable for communicating with a CDMA network of wireless base stations; however, in other aspects, the wireless communication system may comprise another type of cellular telephony network, such as, for example, TDMA, Long-Term Evolution (LTE), or Global System for Mobile Communications (GSM). Additionally, any other type of wide area wireless networking technologies may be used, for example, WiMAX (IEEE 802.16), etc. In one example, the WWAN transceiver(s) 704 may comprise a communication system capable of communicating with an LTE network of wireless base stations. As described above, V2X communication can include communication using WWAN transceiver 704, such as in LTE-based V2X.

The mobile device 700 may also include one or more wireless local area network (WLAN) transceivers (such as illustrated WLAN transceiver 706) that may be connected to one or more antennas 702. The WLAN transceiver 706 comprises suitable devices, hardware, and/or software for communicating with and/or detecting signals to/from WLAN access points and/or directly with other wireless devices within a network. In one aspect, the WLAN transceiver 706 may comprise a Wi-Fi (IEEE 802.11x) communication system suitable for communicating with one or more wireless access points; however, in other aspects, the WLAN transceiver 706 may comprise another type of local area network or personal area network (PAN). Additionally, any other type of wireless networking technologies may be used, for example, Ultra-Wide Band, Bluetooth, ZigBee, wireless USB, etc. As described above, V2X communication can include communication using WLAN transceiver 706 with various vehicles and/or entities.

A satellite positioning system (SPS) receiver 708 may also be included in the mobile device 700. The SPS receiver 708 may be connected to the one or more antennas 702 for receiving satellite signals. The SPS receiver 708 may comprise any suitable hardware and/or software for receiving and processing SPS signals. The SPS receiver 708 requests information and operations as appropriate from the other systems and performs the calculations for determining the position of the mobile device 700 using measurements obtained by any suitable SPS algorithm. In some embodiments, the mobile device 700 is within a vehicle (e.g., vehicle 100 in FIG. 1) and the determined position of the mobile device 700 can be used to track the vehicle as it travels along a route.

A motion sensor 712 may be coupled to a processor 710 to provide movement and/or orientation information, which is independent of motion data derived from signals, received by the WWAN transceiver 704, the WLAN transceiver 706 and the SPS receiver 708.

By way of example, the motion sensor 712 may utilize an accelerometer (e.g., a microelectromechanical systems device), a gyroscope, a geomagnetic sensor (e.g., a compass), an altimeter (e.g., a barometric pressure altimeter), and/or any other type of movement detection sensor. Moreover, the motion sensor 712 may include a plurality of different types of devices and combine their outputs in order to provide motion information. For example, the motion sensor 712 may use a combination of a multi-axis accelerometer and orientation sensors to provide the ability to compute positions in 2-D and/or 3-D coordinate systems. In some embodiments, the computed positions from the motion sensor 712 may be used with the calculated positions from the SPS receiver 708 in order to more accurately determine the position of the mobile device 700 and any associated vehicle containing the mobile device 700.

The processor 710 may be connected to the WWAN transceiver 704, WLAN transceiver 706, the SPS receiver 708 and the motion sensor 712. The processor 710 may include one or more microprocessors, microcontrollers, and/or digital signal processors that provide processing functions, as well as other calculation and control functionality. The processor 710 may also include memory 714 for storing data and software instructions for executing programmed functionality within the mobile device 700. The memory 714 may be on-board the processor 710 (e.g., within the same integrated circuit package), and/or the memory may be external memory to the processor and functionally coupled over a data bus. The functional details associated with aspects of the disclosure will be discussed in more detail below.

A number of software modules and data tables may reside in memory 714 and be utilized by the processor 710 in order to manage both communications and positioning determination functionality. As illustrated in FIG. 7, memory 714 may include and/or otherwise receive a positioning module 728 and a map application 732 capable of generating a map associated with a computed location determined by the positioning module 728, or additionally or alternatively, a map comprising a plurality of routes from, for example, a destination address and a source address. Based on data regarding the locations of V2X-capable entities in the vicinity of the mobile device, the navigation map can also include an indication of the availability of V2X-capable entities along the portions of the plurality of routes as described elsewhere herein. One should appreciate that the organization of the memory contents as shown in FIG. 7 is merely exemplary, and as such the functionality of the modules and/or data structures may be combined, separated, and/or be structured in different ways depending upon the implementation of the mobile device 700. Furthermore, in one embodiment, a battery 760 may be coupled to the processor 710, wherein the battery 760 may supply power to the processor 710 and various other modules and components located on the mobile device 700 through appropriate circuitry and/or under control of the processor 710.

The positioning module 728 can be capable of determining a position based on inputs from wireless signal measurements from WWAN transceiver 704, signal measurements WLAN transceiver 706, data received from SPS receiver 708, and/or data from motion sensor 712. For instance, in some embodiments, the positioning module 728 may direct the processor 710 to take satellite signals from the SPS receiver 708 to determine the global position of the mobile device 700. This position of the mobile device 700 can then be mapped relative to the locations of the routes displayed in the navigation map. The accuracy of the position of the mobile device 700 can be further improved by taking data from neighboring devices or vehicles via the WWAN transceiver 704 and WLAN transceiver 706 (for example, using V2X communications), in order to determine the position of the mobile device 700 relative to neighboring devices or vehicles and make adjustments to the satellite-based position. Additionally, the accuracy of the position of the mobile device 700 can be further improved by taking data from the motion sensor 712, which will provide information about the distance between the mobile device 700 and surrounding objects or landmarks.

The map application 732 can be capable of generating an image of a map of an area surrounding the position determined by the positioning module 728 above. Additionally or alternatively, the map application 732 can be capable of generating an image of a map of an area surrounding any given position based on the map application receiving coordinates of a location. To generate the image, using the computed or received coordinates, the map application 732 can access data from a map server (not illustrated) via, for example, WWAN transceiver 704 or WLAN transceiver 706. The image generated can then be displayed on display 756 or can otherwise be used as described herein, for example, with reference to FIGS. 2A and 2B.

While the modules shown in FIG. 7 are illustrated in the example as being contained in the memory 714, it is recognized that in certain implementations such procedures may be provided for or otherwise operatively arranged using other or additional mechanisms. For example, all or part of the positioning module 728 may be provided in firmware. Also, some aspects of positioning module 728 may be performed in WWAN transceiver 704.

In many embodiments, the memory 714 can include many different kinds of memory and is only illustrated schematically. Memory 714 can include a non-transitory computer readable medium, which may include a read-only memory (ROM) device. The memory 714 may comprise software elements, including an operating system, device drivers, executable libraries, and/or other code, such as the illustrated map application 732. Merely by way of example, one or more procedures described with respect to the method(s) discussed above might be implemented as code and/or instructions for execution by the mobile device 700 (and/or one or more processors of the mobile device 700), in an aspect, then, such code and/or instructions may be used to configure and/or adapt a general purpose computer (or other device) to perform one or more operations in accordance with the described methods with reference, for example, to FIGS. 2A, 2B, 3 and 5.

The mobile device 700 may include a user interface 750, which provides any suitable interface systems, such as a microphone/speaker 752, keypad 754, and display 756 that allows user interaction with the mobile device 700. The microphone/speaker 752 provides for voice communication services using the WWAN transceiver 704 and/or the WLAN transceiver 706. Additionally, the microphone/speaker 752 can provide audio-based navigation instructions. Although illustrated as a single device, it is understood that microphone/speaker 752 may comprise a separate microphone device and a separate speaker device. The keypad 754 comprises any suitable buttons for user input. The display 756 comprises any suitable display, such as, for example, a liquid crystal display, and may further include a touchscreen display for additional or alternative user input modes. The user interface 750 is illustrated as a hardware user interface 750, however, can also be understood to include a graphical user interface displayed on a touchscreen (for example, integrated with display 756) allowing output to a user and receipt of input from the user. Input from, and output to, user can be mediated through the user interface 750 such that the mobile device, for example the processor 710 or other components, can receive user input from the user interface 750 and provide output to the user via the user interface 750.

The processor 710 may include any form of logic suitable for performing at least the techniques provided herein, for example any of the methods or aspects described with reference to FIGS. 2A and 2B, as well as the other figures of this disclosure. For instance, the processor 710 may obtain position or location information via one or more transceivers or sensors, such as the WWAN transceiver 704, WLAN transceiver 706, the SPS receiver 708, and or the motion sensor 712. Using this location information, the processor 710 may utilize the positioning module 728 and the map application 732 in order to map out the location of the mobile device 700 (and the vehicle the mobile device 700 is in) and any surrounding V2X-capable entities, relative to one or more routes between a source address and a destination address in a navigation map. The processor 710 may then cause the navigation map along with the one or more routes to be displayed in the display 756. The navigation map can also be provided in the context of the user interface 750, such that a user can select a specific route presented through the navigation map.

What is claimed is:

1. A method comprising:
obtaining a destination address and a source address;
determining a plurality of routes from the source address to the destination address;
determining an availability of Vehicle to Everything (V2X)-capable entities, capable of providing V2X information, along one or more portions of each respective route;
calculating a travel time estimate for each route based on the availability of V2X-capable entities along the one or more portions of each respective route;
displaying a navigation map for display on an in-vehicle display, the navigation map comprising each route of the plurality of routes and an indication of the availability of V2X-capable entities along the one or more portions of each respective route;
receiving a first input from an in-vehicle display selecting a navigation route from the plurality of routes;
determining, based on a user event having a duration, that the navigation route will not provide sufficient V2X assistance during the user event;
determining an alternative route, wherein the alternative route has available V2X assistance for autonomous driving support over the duration of the user event;
calculating a travel time estimate for the alternative route based on availability of V2X-capable entities along one or more portions of the alternative route during the user event;
determining an estimated change in travel time associated with the alternative route, the estimated change in travel time based at least on the calculated travel time estimate for the alternative route during the user event;
displaying, on the in-vehicle display, an indication of the alternative route and the estimated change in travel time; and
receiving a second input from the in-vehicle display selecting the alternative route.

2. The method of claim 1, further comprising:
selecting a navigation route from the plurality of routes based on the availability of V2X-capable entities along the one or more portions of the navigation route.

3. The method of claim 1, further comprising:
updating the navigation map in the in-vehicle display to show only the alternative route.

4. The method of claim 1, wherein calculating the travel time estimate for each route further comprises:
determining V2X-capabilities of the V2X-capable entities along each respective route.

5. The method of claim 4, further comprising:
updating the travel time estimate for each route based on the V2X-capabilities of V2X-capable entities along each respective route.

6. The method of claim 1, further comprising:
ordering each route in the plurality of routes in an ordered list based on the travel time estimate for each respective route; and
displaying the ordered list of the plurality of routes on the in-vehicle display.

7. The method of claim 1, further comprising:
for each route:
receiving a V2X-capability and a location for each of the V2X-capable entities along the one or more portions of each respective route.

8. The method of claim 7, further comprising:
for each route:
determining, from the V2X-capability and the location for each of the plurality of V2X-capable entities along the one or more portions of each respective route, an availability of assisted driving features along the one or more portions of each respective route.

9. The method of claim 8, further comprising:
updating the navigation map in the in-vehicle display to show availability of assisted driving features along the one or more portions of each route in the plurality of routes.

10. The method of claim 1, further comprising:
receiving a user event;
determining a navigation route from the plurality of routes having availability of V2X-capable entities along a portion of the navigation route expected to be traversed during the user event;
displaying the navigation route on the in-vehicle display.

11. The method of claim 1, further comprising:
receiving a user event;
determining that the user event overlaps in time with a travel time between the source address to the destination address;
determining a navigation route from the plurality of routes based in part on availability of V2X-capable entities along a portion of the navigation route expected to be traversed during the user event; and
displaying the navigation route on the in-vehicle display.

12. The method of claim 11, further comprising:
determining a time to start based at least on:
a travel time from the source address to the portion of the navigation route expected to be traversed during the user event; and
an availability of V2X-capable entities along the portion of the navigation route expected to be traversed during the user event; and
displaying, on the in-vehicle display, the time to start.

13. The method of claim 1, wherein the V2X-capable entities includes Vehicle-to-Vehicle (V2V) capable vehicles or Vehicle-to-Infrastructure (V2I) capable infrastructure.

14. A system comprising:
a vehicle comprising:
an in-vehicle display;
a vehicle-to-everything (V2X) communication-capable WWAN transceiver; and
an on-board navigation computer, communicatively coupled to the in vehicle display and the WWAN transceiver, the on-board navigation computer configured to:
obtain a destination address and a source address;
determine a plurality of routes from the source address to the destination address;
determine determining an availability of Vehicle to Everything (V2X)-capable entities, capable of providing V2X information, along one or more portions of each respective route;
calculate a travel time estimate for each route based on the availability of V2X-capable entities along the one or more portions of each respective route;
display a navigation map on the in-vehicle display, the navigation map comprising each route of the plurality of routes and an indication of the availability of V2X-capable entities along the one or more portions of each respective route;
receive a first input from an in-vehicle display selecting a navigation route from the plurality of routes;

determine, based on a user event having a duration, that the navigation route will not provide sufficient V2X assistance during the user event;

determine an alternative route, wherein the alternative route has available V2X assistance for autonomous driving support over the duration of the user event;

calculate a travel time estimate for the alternative route based on availability of V2X-capable entities along one or more portions of the alternative route during the user event;

determine an estimated change in travel time associated with the alternative route, the estimated change in travel time based at least on the calculated travel time estimate for the alternative route during the user event;

display, on the in-vehicle display, an indication of the alternative route and the estimated change in travel time; and receive a second input from the in-vehicle display selecting the alternative route.

15. The system of claim 14, wherein the on-board navigation computer is further configured to:

select a navigation route from the plurality of routes based on the availability of V2X-capable entities along the one or more portions of the navigation route.

16. An apparatus comprising:

means for obtaining a destination address and a source address;

means for determining a plurality of routes from the source address to the destination address;

means for determining an availability of Vehicle to Everything (V2X)-capable entities capable of providing V2X information, along one or more portions of each route;

means for calculating a travel time estimate for each route based on the availability of V2X-capable entities along the one or more portions of each respective route;

means for displaying a navigation map for display on an in-vehicle display, the navigation map comprising each route of the plurality of routes and an indication of the availability of V2X-capable entities along the one or more portions of each respective route;

means for receiving a first input from an in-vehicle display selecting a navigation route from the plurality of routes;

means for determining, based on a user event having a duration, that the navigation route will not provide sufficient V2X assistance during the user event;

means for determining an alternative route, wherein the alternative route has available V2X assistance for autonomous driving support over the duration of the user event;

means for calculating a travel time estimate for the alternative route based on availability of V2X-capable entities along one or more portions of the alternative route during the user event;

means for determining an estimated change in travel time associated with the alternative route, the estimated change in travel time based at least on the calculated travel time estimate for the alternative route during the user event;

means for displaying, on the in-vehicle display, an indication of the alternative route and the estimated change in travel time; and means for receiving a second input from the in-vehicle display selecting the alternative route.

17. The apparatus of claim 16, further comprising:

means for ordering each route in the plurality of routes in an ordered list based on the travel time estimate for each route; and means for displaying the ordered list of the plurality of routes on the in-vehicle display.

18. The apparatus of claim 16, further comprising:

means for receiving a V2X-capability and a location for each of the V2X-capable entities along the one or more portions of each respective route, means for determining, from the V2X-capability and the location for each of the V2X-capable entities along the one or more portions of each respective route, an availability of assisted driving features along the one or more portions of each respective route; and means for updating the navigation map in the in-vehicle display to show availability of assisted driving features along the one or more portions of each route in the plurality of routes.

19. A non-transitory computer readable memory comprising instructions executable by a processor to cause the processor to:

obtain a destination address and a source address;

determine a plurality of routes from the source address to the destination address;

determine an availability of Vehicle to Everything (V2X)-capable entities, capable of providing V2X information, along one or more portions of each respective route;

calculate a travel time estimate for each route based on the availability of V2X-capable entities along the one or more portions of each respective route;

display a navigation map for display on the in-vehicle display, the navigation map comprising each route in the plurality of routes and an indication of the availability of V2X-capable entities along the one or more portions of each respective route;

receive a first input from an in-vehicle display selecting a navigation route from the plurality of routes;

determine, based on a user event having a duration, that the navigation route will not provide sufficient V2X assistance during the user event;

determine an alternative route, wherein the alternative route has available V2X assistance for autonomous driving support over the duration of the user event;

calculate a travel time estimate for the alternative route based on availability of V2X-capable entities along one or more portions of the alternative route during the user event;

determine an estimated change in travel time associated with the alternative route, the estimated change in travel time based at least on the calculated travel time estimate for the alternative route during the user event;

display, on the in-vehicle display, an indication of the alternative route and the estimated change in travel time; and receive a second input from the in-vehicle display selecting the alternative route.

20. The non-transitory computer readable memory of claim 19, further comprising instructions executable by a processor to cause the processor to:

select a navigation route from the plurality of routes based on the availability of V2X-capable entities along the one or more portions of the navigation route.

* * * * *